(12) United States Patent
Baek et al.

(10) Patent No.: US 9,057,810 B2
(45) Date of Patent: Jun. 16, 2015

(54) LIGHT-EMITTING MODULE, BACKLIGHT ASSEMBLY HAVING THE SAME AND DISPLAY APPARATUS HAVING THE SAME

(75) Inventors: Seung-Hwan Baek, Seoul (KR); Jin Seo, Osan-si (KR); Jae-Sang Lee, Cheonan-si (KR); Hyung-Jin Kim, Seoul (KR); Sang-Won Lee, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 254 days.

(21) Appl. No.: 13/463,139

(22) Filed: May 3, 2012

(65) Prior Publication Data
US 2013/0128606 A1  May 23, 2013

(30) Foreign Application Priority Data

Nov. 22, 2011 (KR) .................. 10-2011-0121967

(51) Int. Cl.
*G02B 6/43* (2006.01)
*F21V 8/00* (2006.01)

(52) U.S. Cl.
CPC ............ *G02B 6/0068* (2013.01); *G02B 6/0031* (2013.01); *G02B 6/0013* (2013.01); *G02B 6/0023* (2013.01); *G02B 6/0073* (2013.01)

(58) Field of Classification Search
CPC .. G02B 6/0023; G02B 6/0068; G02B 6/0073; G02B 6/0013; G02B 6/0031; G02B 6/0066; G02B 6/0091
USPC ............... 362/612, 615, 617, 621, 97.1, 97.2, 362/249.02, 631, 606, 602, 607, 613, 97.3, 362/608
See application file for complete search history.

(56) References Cited

U.S. PATENT DOCUMENTS

| | | | |
|---|---|---|---|
| 7,157,853 B2* | 1/2007 | Imai et al. ................... | 313/512 |
| 7,576,805 B2* | 8/2009 | Ito et al. ...................... | 349/15 |
| 7,771,100 B2* | 8/2010 | Yamamoto et al. .......... | 362/606 |
| 7,798,701 B2 | 9/2010 | Mori et al. | |
| 7,800,711 B2* | 9/2010 | Kim ............................. | 349/65 |
| 2005/0047110 A1* | 3/2005 | Huang et al. ................. | 362/31 |
| 2006/0056200 A1* | 3/2006 | Yamashita et al. ........... | 362/620 |
| 2007/0263409 A1* | 11/2007 | Mok ............................. | 362/612 |
| 2008/0031010 A1* | 2/2008 | Kim et al. ..................... | 362/612 |
| 2008/0316771 A1* | 12/2008 | Mori et al. .................... | 362/633 |
| 2009/0002598 A1* | 1/2009 | Choo et al. ................... | 349/62 |
| 2009/0116262 A1* | 5/2009 | Park ............................. | 362/612 |
| 2009/0196070 A1* | 8/2009 | Kim .............................. | 362/613 |
| 2010/0027291 A1* | 2/2010 | Hamada ........................ | 362/613 |

(Continued)

FOREIGN PATENT DOCUMENTS

| | | | |
|---|---|---|---|
| CN | 1892345 A | * | 1/2007 |
| JP | 2009004198 A | | 1/2009 |
| KR | 0835011 A | | 5/2008 |

OTHER PUBLICATIONS

Shihong, Yang Zhu, Lighting module group capable of eliminating bright spots, Jan. 10, 2007.*

*Primary Examiner* — Ismael Negron
*Assistant Examiner* — James Endo
(74) *Attorney, Agent, or Firm* — Cantor Colburn LLP

(57) ABSTRACT

A light-emitting module includes a light source, a printed circuit board ("PCB") and a light absorption portion. The light source generates and emits a light, and the light source is on a first surface of the PCB. The light absorption portion is on the first surface of the PCB and absorbs the light.

18 Claims, 11 Drawing Sheets

(56) References Cited

U.S. PATENT DOCUMENTS

| | | | |
|---|---|---|---|
| 2010/0073959 A1* | 3/2010 | Hamada | 362/611 |
| 2010/0165237 A1* | 7/2010 | Jung | 349/58 |
| 2010/0165241 A1 | 7/2010 | Kim et al. | |
| 2011/0090711 A1* | 4/2011 | Kim | 362/611 |
| 2011/0170034 A1* | 7/2011 | Jeong | 362/612 |
| 2011/0285927 A1* | 11/2011 | Schultz et al. | 362/612 |
| 2012/0081922 A1* | 4/2012 | Yeh et al. | 362/612 |

* cited by examiner

US 9,057,810 B2

LIGHT-EMITTING MODULE, BACKLIGHT ASSEMBLY HAVING THE SAME AND DISPLAY APPARATUS HAVING THE SAME

This application claims priority to Korean Patent Application No. 2011-0121967, filed on Nov. 22, 2011, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a light-emitting module, a backlight assembly having the light-emitting module and a display apparatus having the light-emitting module. More particularly, exemplary embodiments of the invention relate to a light-emitting module having a light source, a backlight assembly having the light-emitting module and a display apparatus having the light-emitting module.

2. Description of the Related Art

A display apparatus such as a liquid crystal display apparatus includes a backlight assembly. The backlight assembly of the display apparatus includes a light source emitting a light, and a light guide plate adjacent to the light source, receiving the light emitted from the light source and guiding the light to a display panel.

A technology related to a super narrow bezel ("SNB") display apparatus having a bezel of which a width is relatively narrow, has been developing. In the super narrow bezel display apparatus, the width of the periphery around a viewing area (e.g., the bezel) of the display apparatus is decreased such that a distance between the light source adjacent to the viewing area and the light guide plate in the viewing area of the display apparatus decreases.

When the distance between the light source and the light guide plate decreases, the light incident into the light guide plate from the light source may be reflected by the light guide plate and a light reflected by the light guide plate may be incident into optical sheets and a display panel disposed on the light guide plate. Thus, the light reflected by the light guide plate may leak from the backlight assembly including the light source and the light guide plate.

In addition, when the distance between the light source and the light guide plate decreases, a hot spot at which a luminance on the light guide plate is relatively high may be generated. Thus, a display quality of the display apparatus may decrease.

BRIEF SUMMARY OF THE INVENTION

Exemplary embodiments of the invention provide a light-emitting module which enhances a display quality of a display apparatus.

Exemplary embodiments of the invention also provide a backlight assembly including the above-mentioned light-emitting module.

Exemplary embodiments of the invention also provide a display apparatus including the above-mentioned light-emitting module.

According to an exemplary embodiment of the invention, a light-emitting module includes a light source, a printed circuit board ("PCB") and a light absorption portion. The light source generates and emits a light source, and the light source is on a first surface of the PCB. The light absorption portion is on the first surface of the PCB and absorbs the light.

In one embodiment, the light absorption portion may include a black material.

In one embodiment, the black material may include a black photo solder resist ("PSR").

In one embodiment, the light absorption portion on the first surface of the PCB may be at an upper portion of the light source and a lower portion of the light source.

In one embodiment, the number of the light sources may be plural, and the light-emitting module may further include a light reflection portion on the first surface of the PCB and between the light sources.

In one embodiment, the light reflection portion may include a white material.

According to another exemplary embodiment of the invention, a backlight assembly includes a light-emitting module, a light guide plate and a lower receiving container. The light-emitting module includes a light source which generates and emits a light, a PCB including the light source on a first surface thereof, and a light absorption portion on the first surface of the PCB and absorbing the light. The light guide plate is adjacent to the light-emitting module, and includes a side surface into which the light is incident and a light exiting surface through which the light incident into the side surface exits. The lower receiving container receives the light-emitting module and the light guide plate.

In one embodiment, the backlight assembly may further include an optical sheet and a second light absorption portion. The optical sheet is on the light guide plate and enhances an efficiency of the light exiting from the light guide plate. The second light absorption portion is at an edge portion of the optical sheet and absorbs the light.

In one embodiment, the second light absorption portion may include a black material.

In one embodiment, the second light absorption portion may absorb a light reflected by the light-emitting module and the light guide plate.

In one embodiment, the second light absorption portion may be on an upper surface of the optical sheet.

In one embodiment, the second light absorption portion may be on a lower surface of the optical sheet.

In one embodiment, the second light absorption portion may be at an edge portion of the optical sheet adjacent to the light-emitting module.

In one embodiment, the second light absorption portion may be at two edge portions of the optical sheet adjacent to the light-emitting module.

In one embodiment, the second light absorption portion may be at four edge portions of the optical sheet.

In one embodiment, the number of the light sources may be plural, and the light-emitting module may further include a light reflection portion on the first surface of the PCB and between the light sources.

In one embodiment, the light reflection portion may include a white material.

According to still another exemplary embodiment of the invention, a display apparatus includes a backlight assembly and a display panel. The backlight assembly includes a light-emitting module, a light guide plate and a lower receiving container. The light-emitting module includes a light source emitting a light, a PCB including the light source on a first surface thereof, and a light absorption portion on the first surface of the PCB and absorbing the light. The light guide plate is adjacent to the light-emitting module and includes a side surface into which the light is incident and a light exiting surface through which the light incident into the side surface exits. The lower receiving container receives the light-emitting module and the light guide plate. The display panel displays an image using the light exiting from the light exiting surface.

In one embodiment, the display apparatus may further include an upper receiving container and a combining member. The upper receiving container may be combined with the lower receiving container and receive the display panel. The combining member may combine the upper receiving container with the PCB.

In one embodiment, the PCB may further include a groove in a second surface thereof, the second surface of the PCB opposite to the first surface including the light source. The combining member is in the groove.

According to the invention, a light absorption portion is on a same surface of the PCB on which a light source is mounted, and thus a light reflected by a light guide plate is absorbed and leaking of the light from the backlight assembly may be reduced or effectively prevented. Thus, a display quality of the display apparatus may increase.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
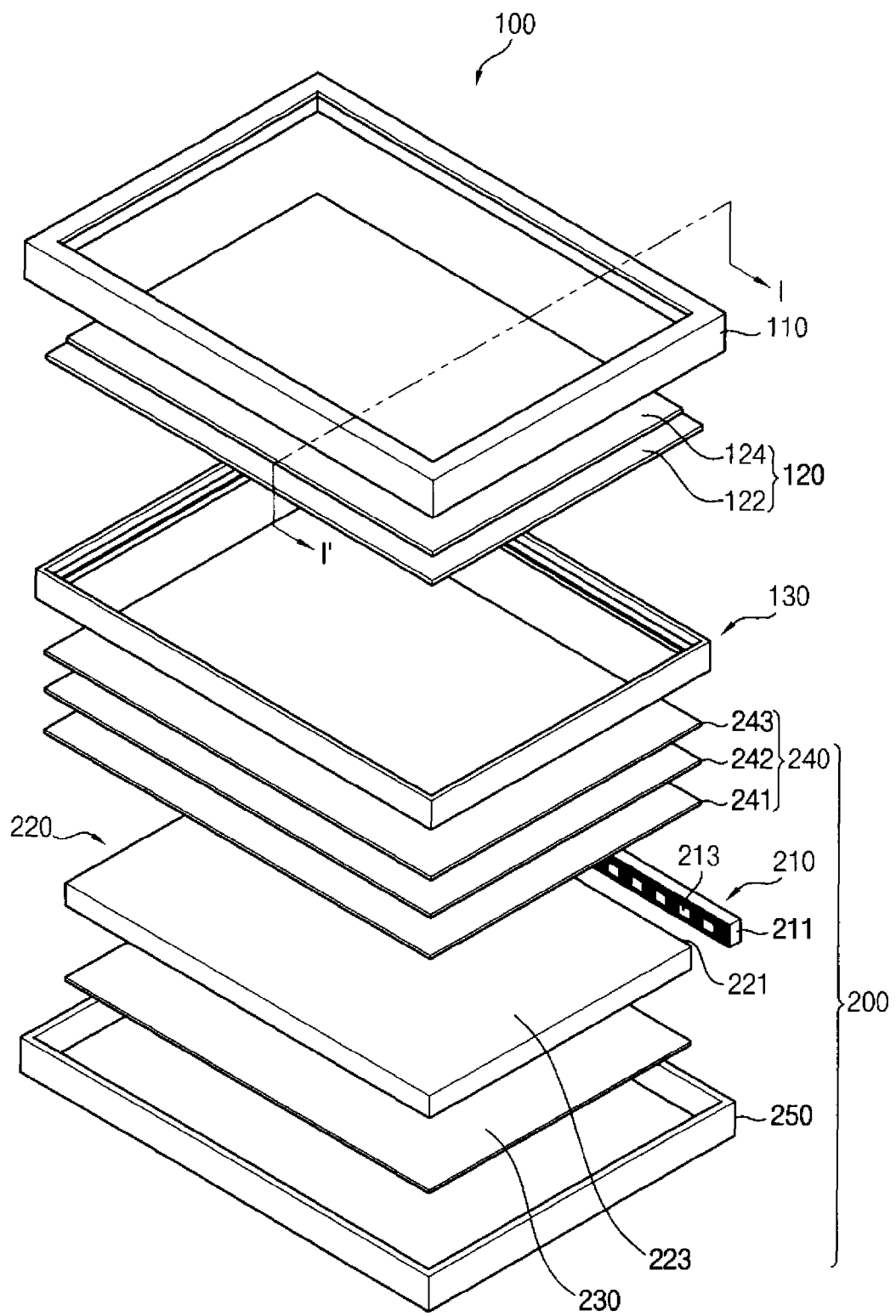
FIG. 1 is an exploded perspective view illustrating an exemplary embodiment of a display apparatus according to the invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
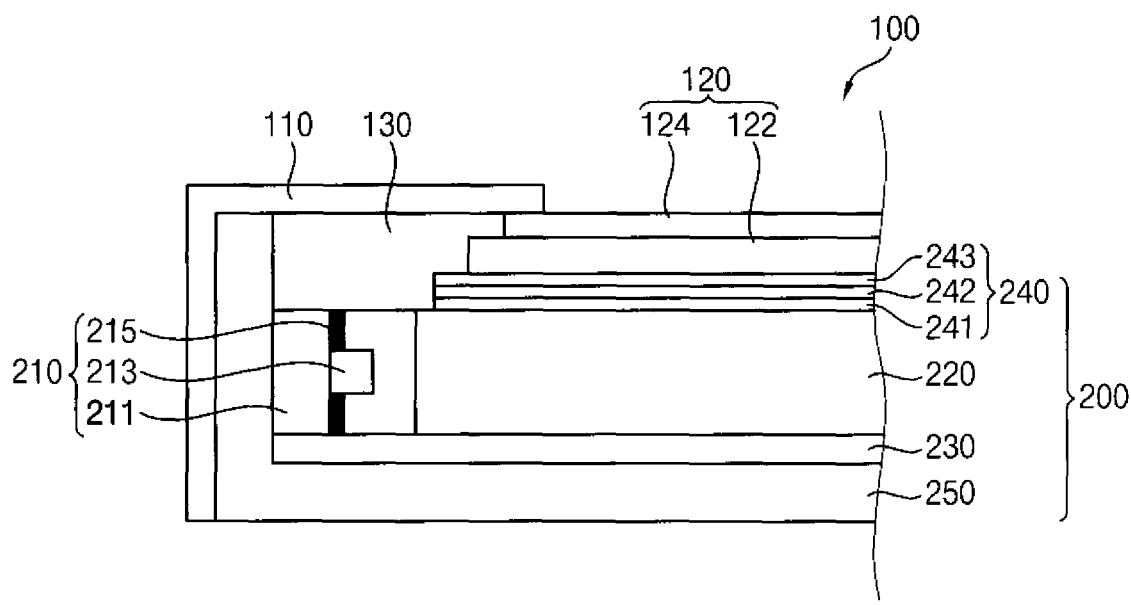
FIG. 2 is a cross-sectional view taken along line I-I' of FIG. 1.
Figure 3:
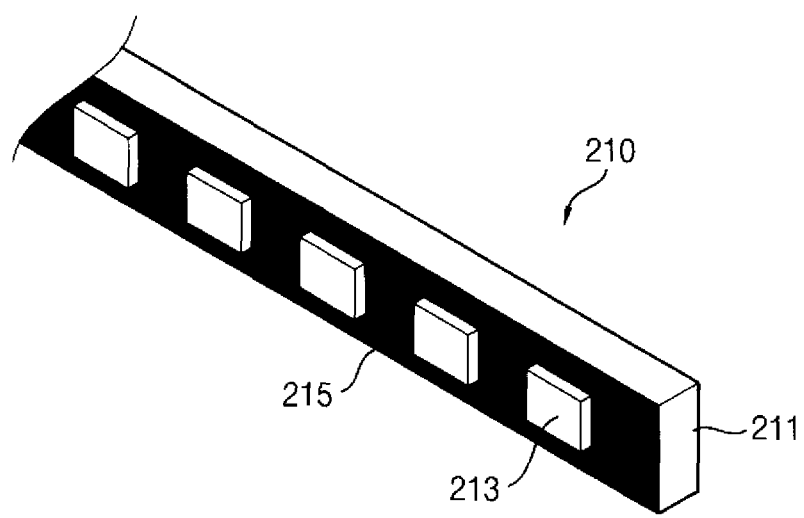
FIG. 3 is a perspective view illustrating an exemplary embodiment of a light-emitting module of FIG. 1.

FIG. 1 is an exploded perspective view illustrating an exemplary embodiment of a display apparatus according to the invention, FIG. 2 is a cross-sectional view taken along line I-I' of FIG. 1, and FIG. 3 is a perspective view illustrating an exemplary embodiment of a light-emitting module 210 of FIG. 1.

Referring to FIGS. 1 to 3, an exemplary embodiment of display apparatus 100 includes an upper receiving container 110, a display panel 120 and a backlight assembly 200.

The upper receiving container 110 is disposed over the display panel 120 to protect the display panel 120 from an external impact, and includes a window to expose a display area of the display panel 120.

The display panel 120 includes a thin-film transistor substrate 122, a color filter substrate 124 and a liquid crystal layer (not shown). The thin-film transistor substrate 122 includes a first base substrate, a thin-film transistor and a pixel electrode. The color filter substrate 124 faces the thin-film transistor substrate 122. The color filter substrate 124 includes a second base substrate, a color filter and a common electrode. The liquid crystal layer is interposed between the thin-film transistor substrate 122 and the color filter substrate 124, and a liquid crystal of the liquid crystal layer is aligned by an electric field generated between the pixel electrode of the thin-film transistor substrate 122 and the common electrode of the color filter substrate 124. The display panel 120 displays an image using a light exiting from a light exit surface 223 of a light guide plate 220 of the backlight assembly 200.

The backlight assembly 200 is disposed under the display panel 120, and generates and provides the light to the display panel 120. The backlight assembly 200 includes the light-emitting module 210, the light guide plate 220, a reflection sheet 230, optical sheets 240 and a lower receiving container 250.

The light-emitting module 210 includes a printed circuit board ("PCB") 211, a light source 213 and a first light absorption portion 215.

Signal lines for supplying a driving voltage to the light source 213 are on the PCB 211. The light source 213 is mounted on the PCB 211 and receives the driving voltage from the PCB 211 to generate the light. In one or more exemplary embodiment, for example, the light source 213 may be a light emitting diode ("LED"). The PCB 211 may be a metal core PCB ("MCPCB") for transferring heat generated from the light source 213.

The first light absorption portion 215 is on a front surface of the PCB 211, and absorbs a light reflected by the light guide plate 220 among the light incident into the light guide plate 220 from the light-emitting module 210. The first light absorption portion 215 may include a black material, and for example, the black material may include a black photo solder resist ("PSR"). Thus, the first light absorption portion 215 may reduce or effectively prevent the light reflected by the light guide plate 220 from being incident into the optical sheets 240 and the display panel 120. Thus, leaking of the light from the backlight assembly 200 may be reduced or effectively prevented.

The light guide plate 220 is disposed at a side of the light-emitting module 210 and faces the front surface of the PCB 211. The light guide plate 220 includes a side surface 221 into which the light is incident and the light exiting surface 223 through which the light initially incident into the side surface 221 exits toward the display panel 120.

The reflection sheet 230 is disposed between the light guide plate 220 and the lower receiving container 250, and between the light-emitting module 210 and the lower receiving container 250, to reflect light leaking from the light-emitting module 210 and from the light guide plate 220.

The optical sheets 240 are disposed over the light guide plate 220 to enhance an efficiency of the light exiting from the light guide plate 220. The optical sheets 240 may include a first optical sheet 241, a second optical sheet 242 and a third optical sheet 243, and for example, respectively the first optical sheet 241, the second optical sheet 242 and the third optical sheet 243 may be a diffusion sheet, a prism sheet and a light-condensing sheet.

The lower receiving container 250 is combined with the upper receiving container 110 to receive the reflection sheet 230, the light guide plate 220, the light-emitting module 210, the optical sheets 240 and the display panel 120 therein.

The display apparatus 100 may further include a mold frame 130. The mold frame 130 is disposed between the display panel 120 and the optical sheets 240 to support the display panel 120, and the mold frame 130 fixes the light guide plate 220, the optical sheets 240 and the reflection sheet 230 to the lower receiving container 250.

Figure 4A:
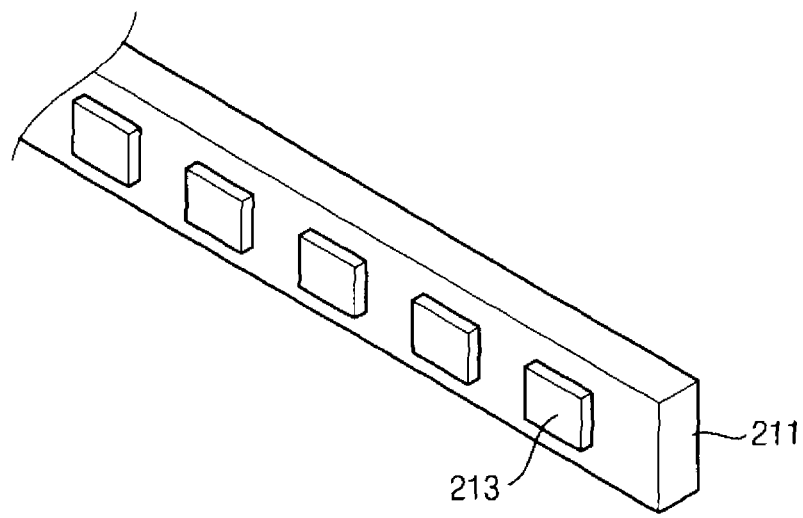
FIGS. 4A and 4B are perspective views illustrating an exemplary embodiment of a method of manufacturing the light-emitting module in FIGS. 1 to 3.
Figure 4B:
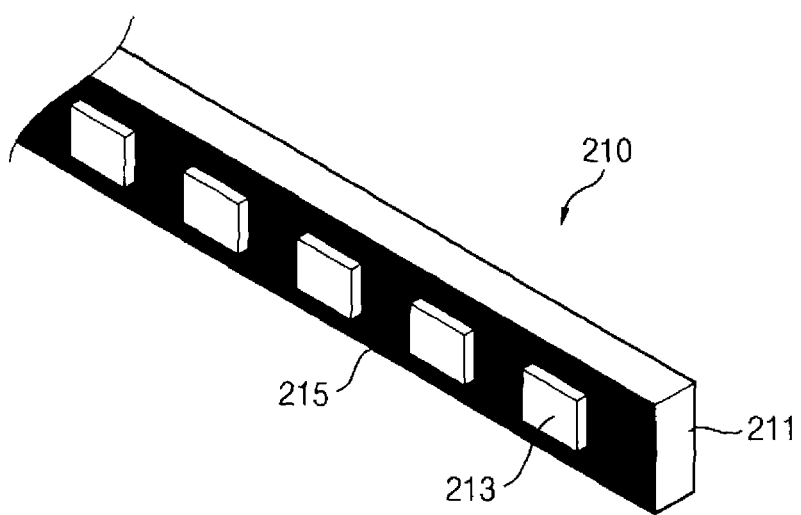

FIGS. 4A and 4B are perspective views illustrating an exemplary embodiment of a method of manufacturing the light-emitting module 210 in FIGS. 1 to 3.

Referring to FIG. 4A, the light source 213 is mounted on the PCB 211, such as on a front surface of the PCB 211. The light source 213 may be plural in number. The light sources 213 may be spaced apart from each other on the PCB 211 along a longitudinal axis of the PCB 211.

Referring to FIG. 4B, the first light absorption portion 215 is on the front surface of the PCB 211, or on a same surface including the light sources 213. The first light absorption portion 215 may include the black material, and the first light absorption portion 215 may be coated on the front surface of the PCB 211 using a coating apparatus.

According to the exemplary embodiment, the first light absorption portion 215 may reduce or effectively prevent the light reflected by the light guide plate 220 from being incident into the optical sheets 240 and the display panel 120. Thus, leaking of the light from the backlight assembly 200 may be reduced or effectively prevented.

Figure 5:
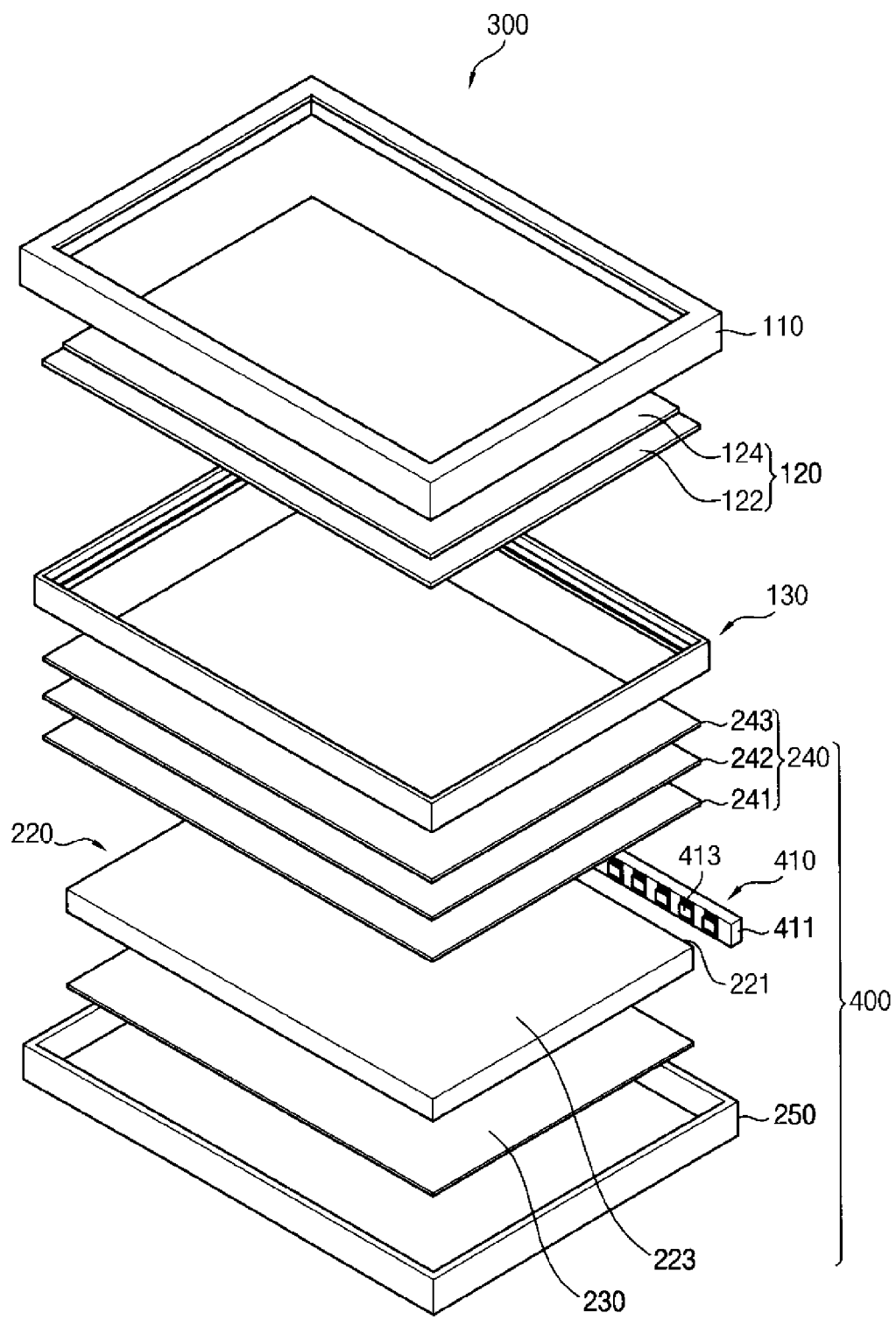
FIG. 5 is an exploded perspective view illustrating another exemplary embodiment of a display apparatus according to the invention.
Figure 6:
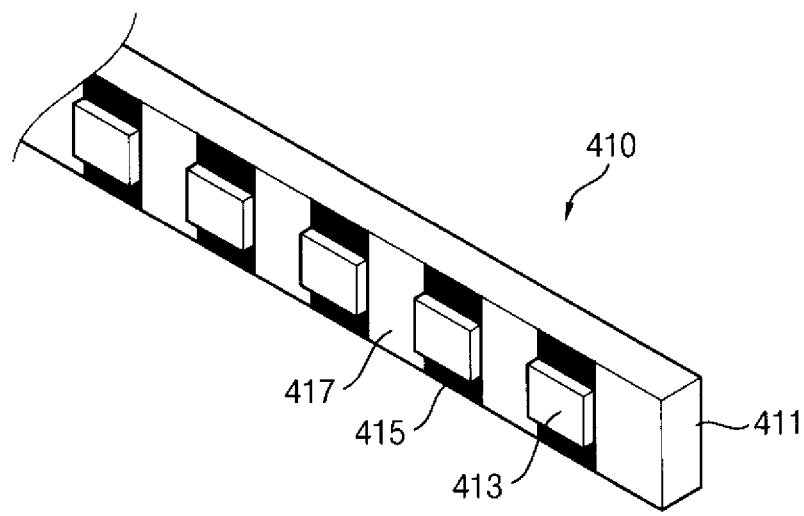
FIG. 6 is a perspective view illustrating an exemplary embodiment of a light-emitting module of FIG. 5.

FIG. 5 is an exploded perspective view illustrating another exemplary embodiment of a display apparatus according to the invention, and FIG. 6 is a perspective view illustrating an exemplary embodiment of a light-emitting module 410 of FIG. 5.

The exemplary embodiment of display apparatus 300 is substantially the same as the previous exemplary embodiment of the display apparatus 100 illustrated in FIGS. 1 and 2 except for a light-emitting module 410 of a backlight assembly 400. Thus, the same reference numerals will be used to refer to same or like parts as those described in the previous exemplary embodiment and any further repetitive explanation concerning the above elements will be omitted.

Referring to FIGS. 5 and 6, the exemplary embodiment of the backlight assembly 400 includes the light-emitting module 410, the light guide plate 220, the reflection sheet 230, the optical sheets 240 and the lower receiving container 250.

The light-emitting module 410 includes a PCB 411, a light source 413, a first light absorption portion 415 and a light reflection portion 417.

Signal lines for supplying a driving voltage to the light source 413 are on the PCB 411. The light source 413 is mounted on the PCB 411 and receives the driving voltage from the PCB 411 to generate the light.

The first light absorption portion 415 is on a front surface of the PCB 411, and absorbs the light reflected by the light guide plate 220 among the light incident into the light guide plate 220 from the light-emitting module 410. In one or more exemplary embodiment, for example, the first light absorption portion 415 may be at an upper portion of the light source 413 and a lower portion of the light source 413 on the front surface the PCB 211. The first light absorption portion 415 may include a black material, and for example, the black material may include a black PSR. Thus, the first light absorption portion 415 may reduce or effectively prevent the light reflected by the light guide plate 220 from being incident into the optical sheets 240 and the display panel 120, and thus, the leaking of the light from the backlight assembly 400 may be reduced or effectively prevented.

The light reflection portion 417 is disposed between adjacent light sources 413 on the front surface of the PCB 411, and reflects the light reflected by the light guide plate 220 to the light guide plate 220 among the light incident into the light guide plate 220 from the light-emitting module 410. The light reflection portion 417 may include a white material, and for example, the white material may include a white PSR. Thus the light reflection portion 417 may enhance an efficiency of the light.

Figure 7A:
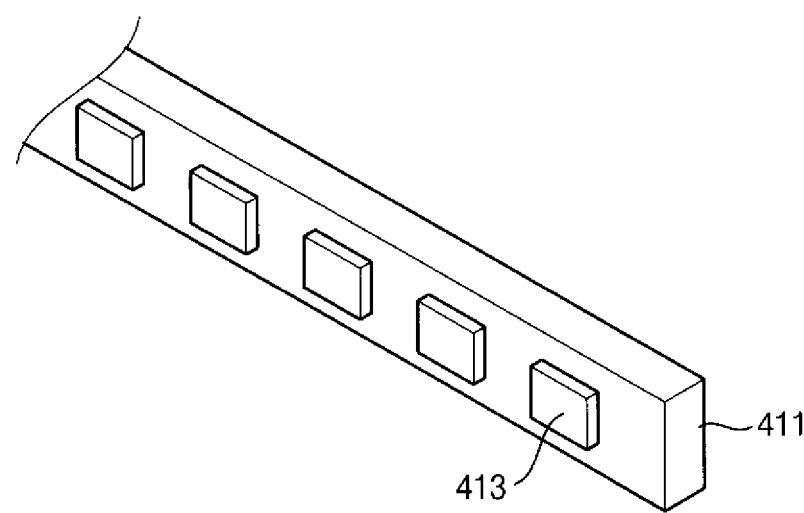
FIGS. 7A to 7C are perspective views illustrating an exemplary embodiment of a method of manufacturing the light-emitting module in FIGS. 5 and 6.
Figure 7B:
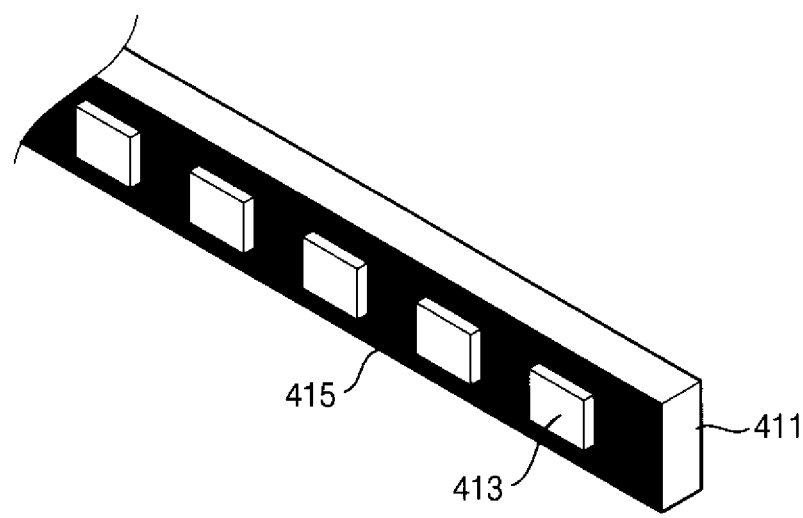
Figure 7C:
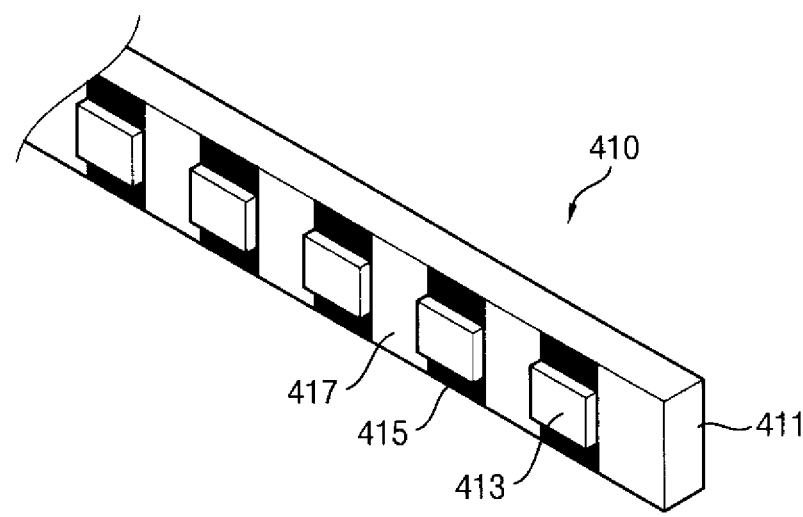

FIGS. 7A to 7C are perspective views illustrating an exemplary embodiment of a method of manufacturing the light-emitting module 410 in FIGS. 5 and 6.

Referring to FIG. 7A, the light source 413 is mounted on the PCB 411, such as on a front surface of the PCB 411. The light source 413 may be plural in number. The light sources 413 may be spaced apart from each other on the PCB 411 along a longitudinal axis of the PCB 411.

Referring to FIG. 7B, the first light absorption portion 415 is on the front surface of the PCB 411, or on a same surface including the light sources 413. The first light absorption portion 415 may include the black material, and the first light absorption portion 415 may be coated on the front surface of the PCB 411 using a coating apparatus.

Referring to FIG. 7C, the light reflection portion 417 corresponding to a width of the light source 413 is on the front surface of the PCB 411, or on the same surface including the light sources 413. The light reflection portion 417 may include the white material, and the light reflection portion 417 may be coated between the adjacent light sources 413 on the PCB 411 using the coating apparatus. The width of the light source 413 may be taken along the longitudinal axis of the PCB 411.

According to the exemplary embodiment, the first light absorption portion 415 may reduce or effectively prevent the light reflected by the light guide plate 220 from being incident into the optical sheets 240 and the display panel 120, and thus, leaking of the light from the backlight assembly 400 may be reduced or effectively prevented.

In addition, the light reflection portion 417 may reflect the light reflected by the light guide plate 220 to the light guide plate 220 among the light incident into the light guide plate 220 from the light-emitting module 410, and thus, the efficiency of the light may be enhanced.

Figure 8:
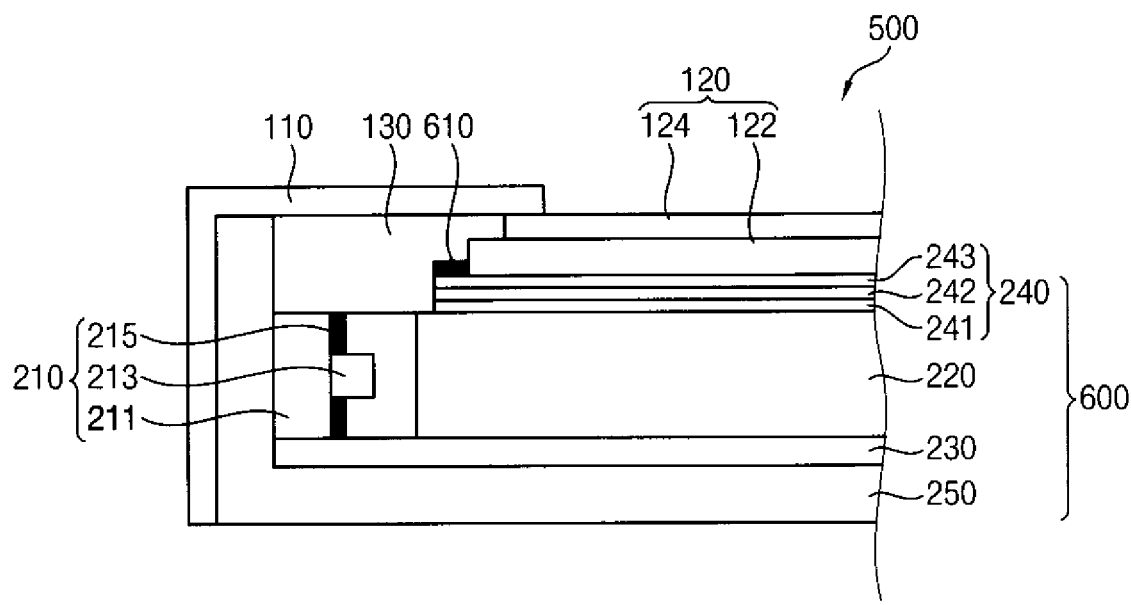
FIG. 8 is a cross-sectional view illustrating still another exemplary embodiment of a display apparatus according to the invention.

FIG. 8 is a cross-sectional view illustrating still another exemplary embodiment of a display apparatus according to the invention.

The exemplary embodiment of display apparatus 500 is substantially the same as the previous exemplary embodiment of the display apparatus 100 illustrated in FIGS. 1 and 2 except for a second light absorption portion 610 of a backlight assembly 600. Thus, the same reference numerals will be used to refer to same or like parts as those described in the previous exemplary embodiment and any further repetitive explanation concerning the above elements will be omitted.

Referring to FIG. 8, the exemplary embodiment of the backlight assembly 600 includes the light-emitting module 210, the light guide plate 220, the reflection sheet 230, the optical sheets 240, the lower receiving container 250 and the second light absorption portion 610.

The second light absorption portion 610 is at an edge portion of the optical sheets 240. In one or more exemplary embodiment, for example, the optical sheets 240 may include the first optical sheet 241, the second optical sheet 242 and the third optical sheet 243 sequentially laminated on the light guide plate 220. The second light absorption portion 610 may be on an upper surface of the uppermost third optical sheet 243 of the optical sheets 240.

The second light absorption portion 610 may include a black material, and the second light absorption portion 610 may absorb the light reflected by the light guide plate 220 and the light-emitting module 210 among the light incident into the light guide plate 220 from the light-emitting module 210. Thus, the second light absorption portion 610 may reduce or effectively prevent the light reflected by the light guide plate 220 and the light-emitting module 210 from being incident into the display panel 120, and thus, leaking of the light from the backlight assembly 600 may be reduced or effectively prevented.

Figure 9A:
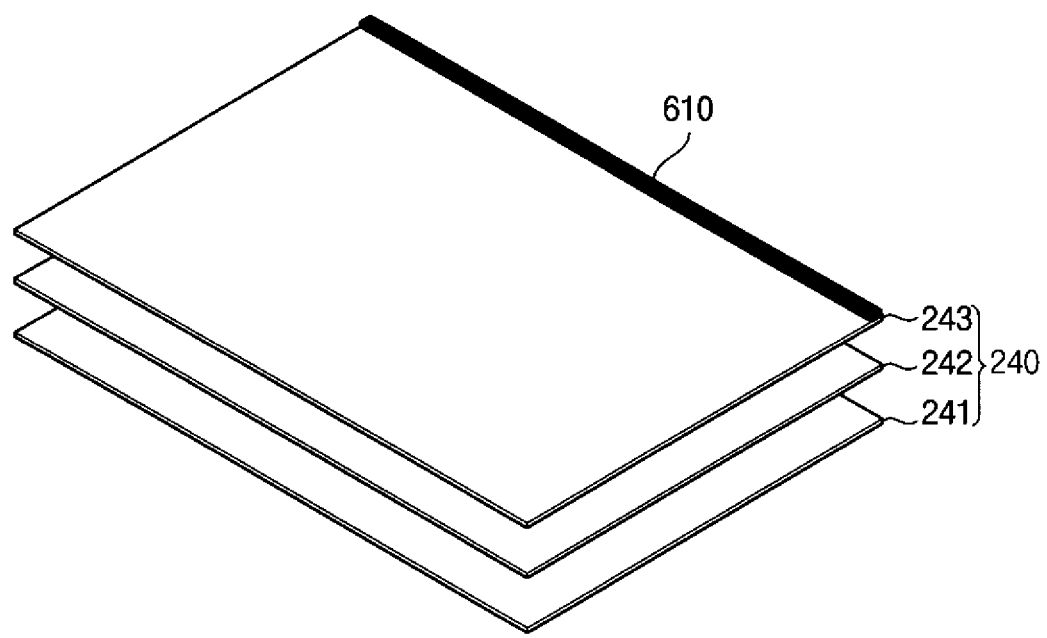
FIGS. 9A to 9C are perspective views illustrating exemplary embodiments of the second light absorption portion in FIG. 8.
Figure 9B:
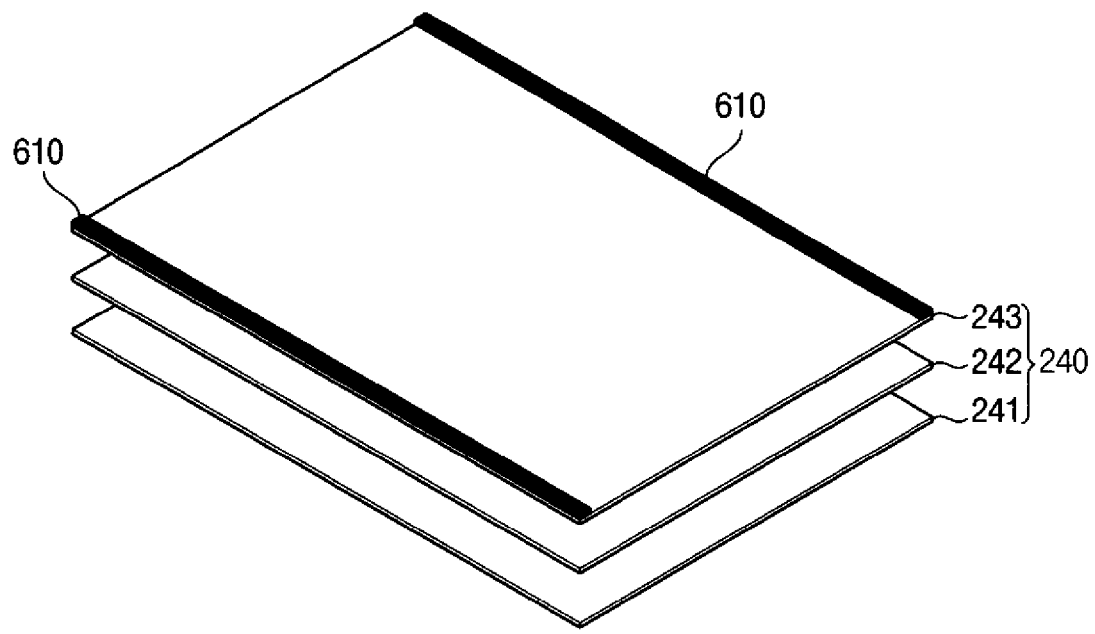
Figure 9C:
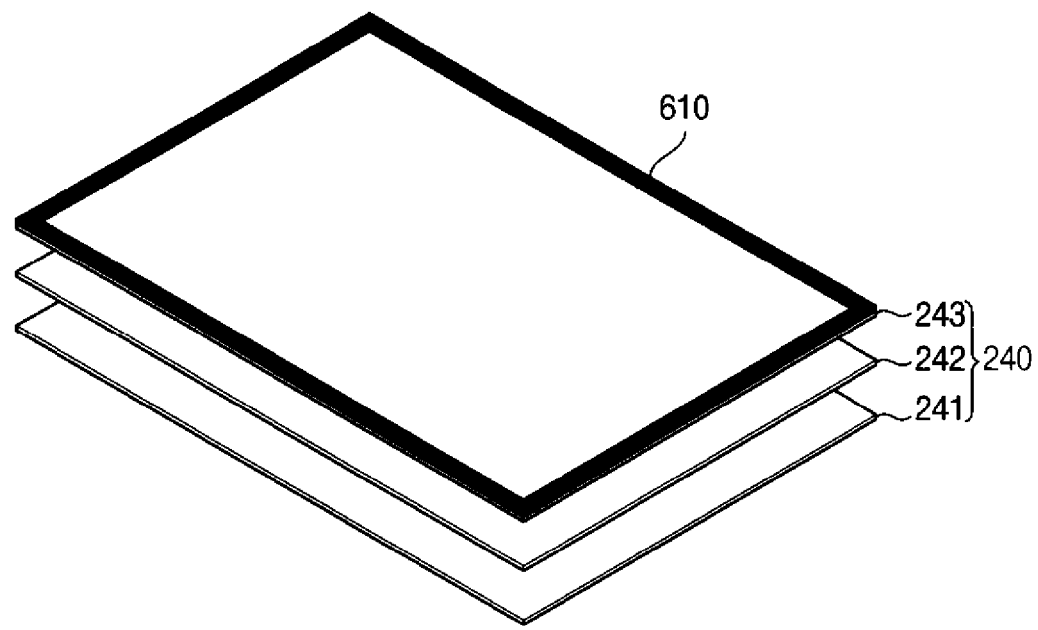

FIGS. 9A to 9C are perspective views illustrating exemplary embodiments of the second light absorption portion 610 in FIG. 8.

Referring to FIG. 9A, the second light absorption portion 610 may be at one edge portion of the third optical sheet 243. The edge portion of the third optical sheet 243 including the second light absorption portion 610 may be adjacent to the light-emitting module 210.

Referring to FIG. 9B, the second light absorption portion 610 may be at two edge portions opposite to each other of the third optical sheet 243. The light-emitting module 210 may face two opposing side surfaces of the light guide plate 220, and the two edge portions of the third optical sheet 243 including the second light absorption portion 610 may be adjacent to the light-emitting module 210.

Referring to FIG. 9C, the second light absorption portion 610 may be at four edge portions of the third optical sheet 243. Thus, the second light absorption portion 610 may increase an absorption rate of the light reflected by the light guide plate 220 and the light-emitting module 210.

Figure 10A:
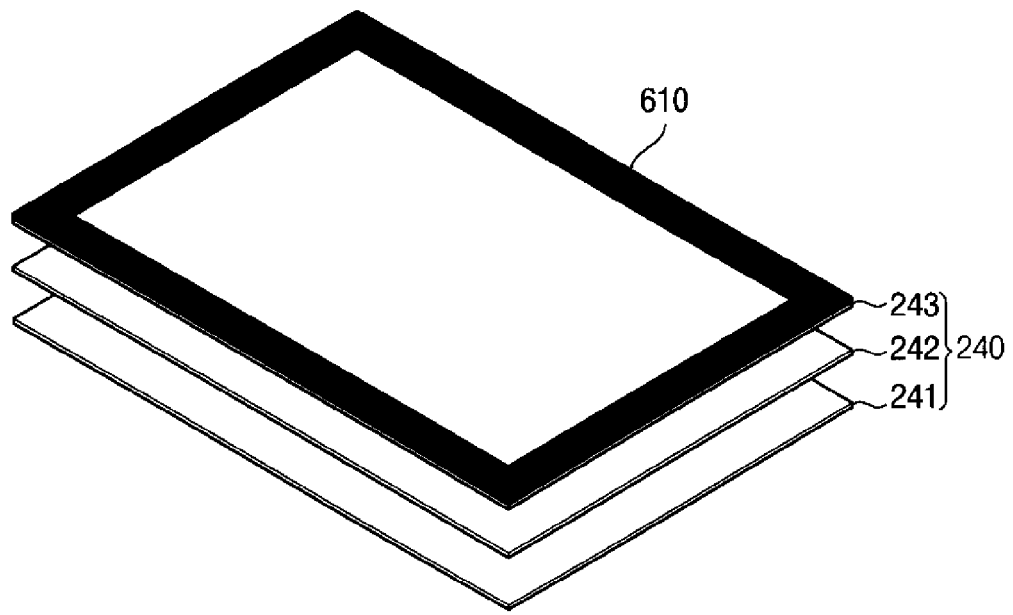
FIGS. 10A and 10B are perspective views illustrating an exemplary embodiment of a method of manufacturing the second light absorption portion in FIG. 9C.
Figure 10B:
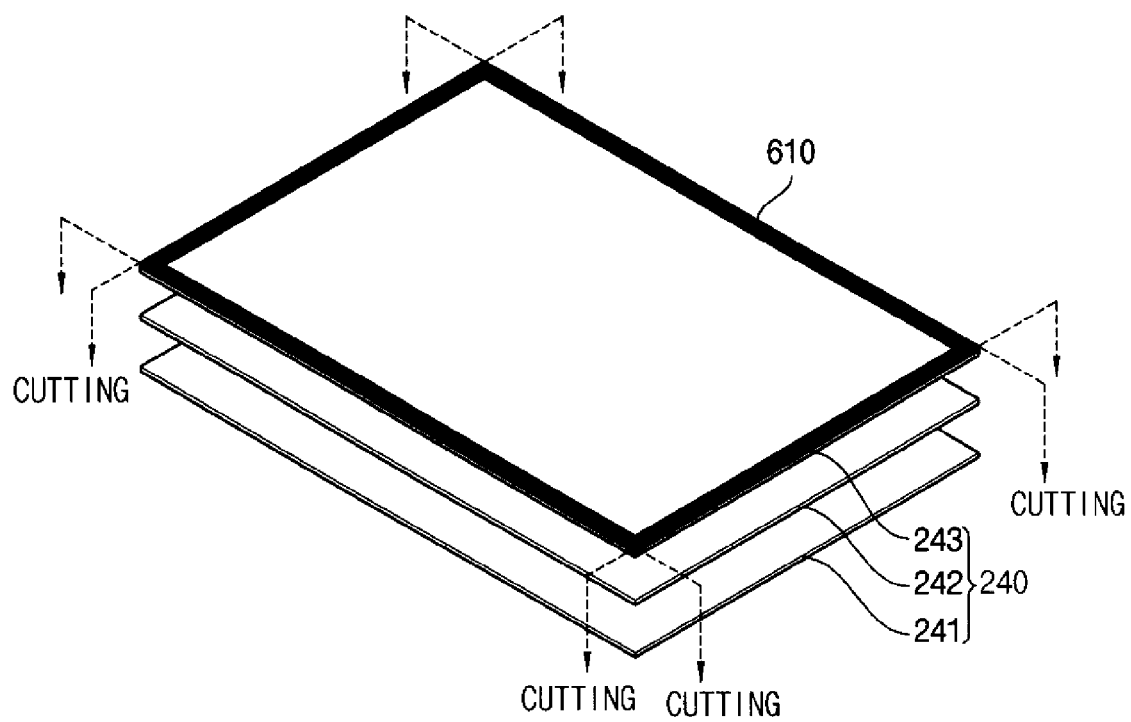

FIGS. 10A and 10B are perspective views illustrating an exemplary embodiment of a method of manufacturing the second light absorption portion 610 in FIG. 9C.

Referring to FIG. 10A, the second light absorption portion 610 is at the four edge portions on the upper surface of the third optical sheet 243. The second light absorption portion 610 may be at the four edge portions on the upper surface of the third optical sheet 243 using a coating apparatus.

Referring to FIG. 10B, an edge portion of the second light absorption portion 610 is removed, such as by cutting, so as to adjust a width of the second light absorption portion 610. The width of the second light absorption portion 610 is taken perpendicular from a respective edge of the third optical sheet 243 and toward an inner area of the third optical sheet 243, in the plan view. Alternatively, a process of cutting the edge portion of the second light absorption portion 610 may be omitted.

An exemplary embodiment of a method of manufacturing the second light absorption portion 610 in FIG. 9A and an exemplary embodiment of a method of manufacturing the second light absorption portion 610 in FIG. 9B may be substantially the same as the method of manufacturing the second light absorption portion 610 in FIG. 9C, and thus any further repetitive explanation concerning the above elements will be omitted.

According to the exemplary embodiment, the second light absorption portion 610 at the edge portion of the optical sheets 240 may absorb the light reflected by the light guide plate 220 and the light-emitting module 210. The second light absorption portion 610 may reduce or effectively prevent the light reflected by the light guide plate 220 and the light-emitting module 210 from being incident into the display panel 120. Thus, leaking of the light from the backlight assembly 600 may be reduced or effectively prevented.

In addition, the second light absorption portion 610 is at the edge portion of the optical sheets 240, and thus a hot spot at which a luminance on the light guide plate 220 adjacent to the light source 213 is relatively high may be reduced or effectively prevented.

Figure 11:
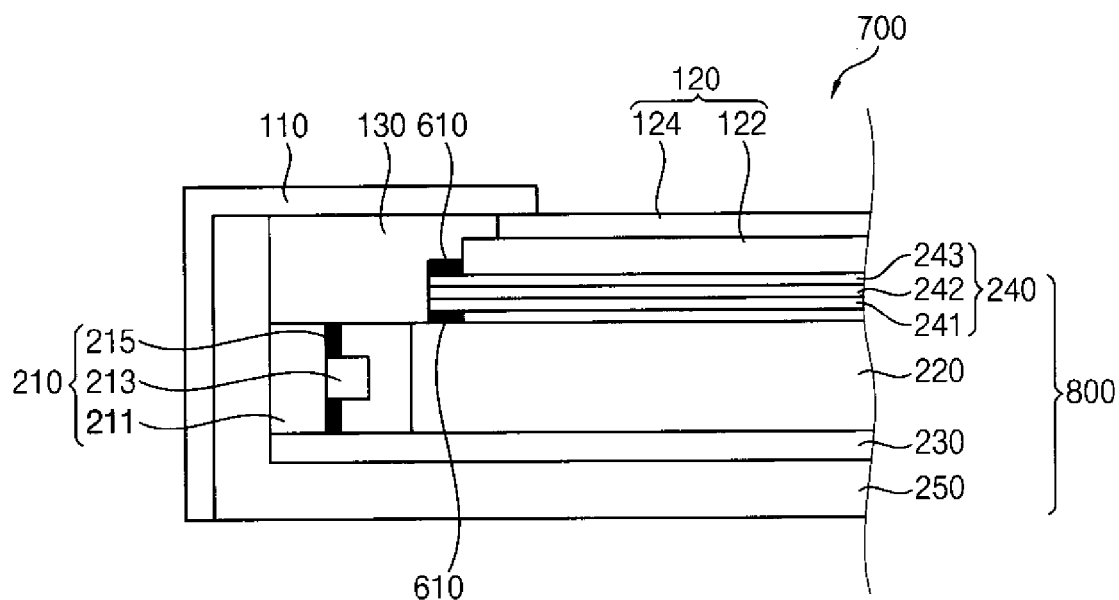
FIG. 11 is a cross-sectional view illustrating still another exemplary embodiment of a display apparatus according to the invention.

FIG. 11 is a cross-sectional view illustrating still another exemplary embodiment of a display apparatus according to the invention.

The exemplary embodiment of display apparatus 700 is substantially the same as the previous exemplary embodiment of the display apparatus 500 illustrated in FIG. 8 except for the second light absorption portion 610 of a backlight assembly 800. Thus, the same reference numerals will be used to refer to same or like parts as those described in the previous exemplary embodiment and any further repetitive explanation concerning the above elements will be omitted.

Referring to FIG. 11, the exemplary embodiment of the the backlight assembly 800 includes the light-emitting module 210, the light guide plate 220, the reflection sheet 230, the optical sheets 240, the lower receiving container 250 and the second light absorption portion 610.

The second light absorption portion 610 is at the edge portion of the optical sheets 240. In one or more exemplary embodiment, for example, the optical sheets 240 may include the first optical sheet 241, the second optical sheet 242 and the third optical sheet 243 sequentially laminated on the light guide plate 220, and the second light absorption portion 610 may be on the upper surface of the third optical sheet 243 and a lower surface of the first optical sheet 241.

The second light absorption portion 610 may include a black material, and the second light absorption portion 610 may absorb the light reflected by the light guide plate 220 and the light-emitting module 210 among the light incident into the light guide plate 220 from the light-emitting module 210. Thus, the second light absorption portion 610 on the lower surface of the first optical sheet 241 may reduce or effectively prevent the light from being incident into the optical sheets 240, the second light absorption portion 610 on the upper surface of the third optical sheet 243 may reduce or effectively prevent the light from being incident into the display panel 120, and thus, leaking of the light from the backlight assembly 800 may be reduced or effectively prevented.

In addition, the second light absorption portion 610 is at the edge portion of the optical sheets 240, and thus the hot spot at which the luminance on the light guide plate 220 adjacent to the light source 213 is relatively high may be reduced or effectively prevented.

Figure 12:
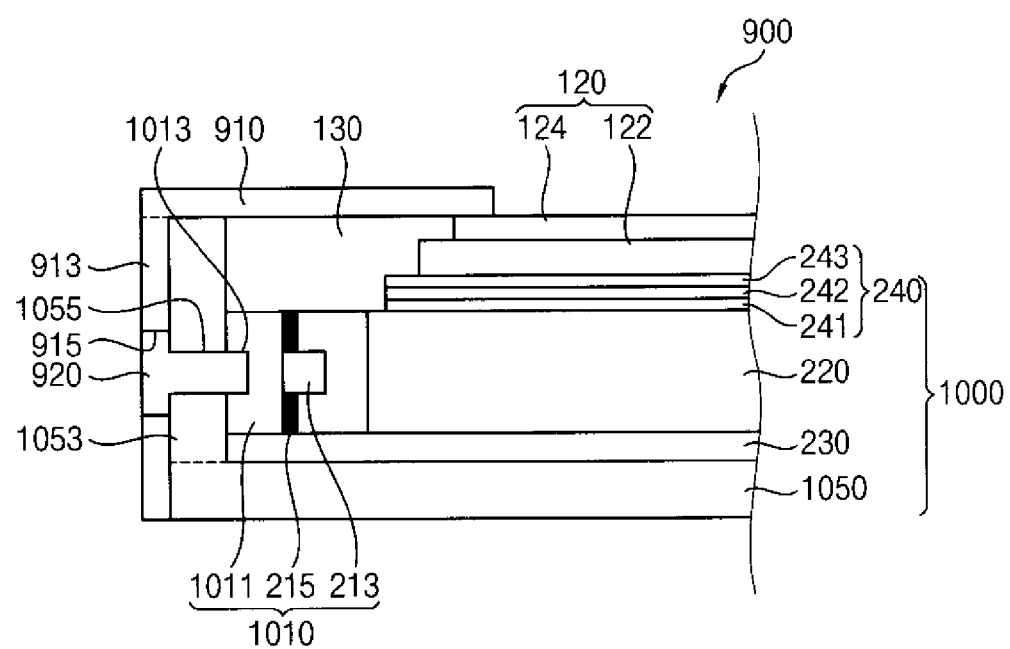
FIG. 12 is a cross-sectional view illustrating still another exemplary embodiment of a display apparatus according to the invention.

FIG. 12 is a cross-sectional view illustrating still another exemplary embodiment of a display apparatus according to the invention.

The exemplary embodiment of display apparatus 900 is substantially the same as the previous exemplary embodiment of the display apparatus 100 illustrated in FIGS. 1 and 2 except for an upper receiving container 910, a combining member 920, a light-emitting module 1010 of a backlight assembly 1000 and a lower receiving container 1050. Thus, the same reference numerals will be used to refer to same or like parts as those described in the previous exemplary embodiment and any further repetitive explanation concerning the above elements will be omitted.

Referring to FIG. 12, the exemplary embodiment of the backlight assembly 1000 includes the light-emitting module 1010, the light guide plate 220, the reflection sheet 230, the optical sheets 240 and the lower receiving container 1050.

The light-emitting module 1010 includes a PCB 1011, the light source 213 and the first light absorption portion 215.

The light source 213 is mounted on a front surface of the PCB 1011, and a groove 1013 is in a rear surface of the PCB 1011 and extending toward an inner area of the PCB 1011.

The lower receiving container 1050 is combined with the upper receiving container 910 to receive the reflection sheet 230, the light guide plate 220, the light-emitting module 1010, the optical sheets 240 and the display panel 120 therein. The lower receiving container 1050 includes a first side wall 1053 making contact with the rear surface of the PCB 1011, and the first side wall 1053 of the lower receiving container 1050 includes a first hole 1055.

The upper receiving container 910 is combined with the lower receiving container 1050 to receive the display panel 120. The upper receiving container 910 includes a second side wall 913 making contact with the first side wall 1053 of the lower receiving container 1050, and the second side wall 913 of the upper receiving container 910 includes a second hole 915 which is aligned with the first hole 1055.

The display apparatus 900 further includes the combining member 920 combining the upper receiving container 910 with the backlight assembly 1000. The combining member 920 passes through the groove 1013 in the PCB 1011, the first hole 1055 in the first side wall 1053 of the lower receiving container 1050 and the second hole 915 in the second side wall 913 of the upper receiving container 910 to combine the upper receiving container 910 with the backlight assembly 1000. In one or more exemplary embodiment, for example, the combining member 920 may be a screw or a bolt.

According to the exemplary embodiment, the combining member 920 passes through the groove 1013 in the PCB 1011, the first hole 1055 in the first side wall 1053 of the lower receiving container 1050 and the second hole 915 in the second side wall 913 of the upper receiving container 910, and thus combining of the upper receiving container 910 with the backlight assembly 100 may be strengthened.

Figure 13:
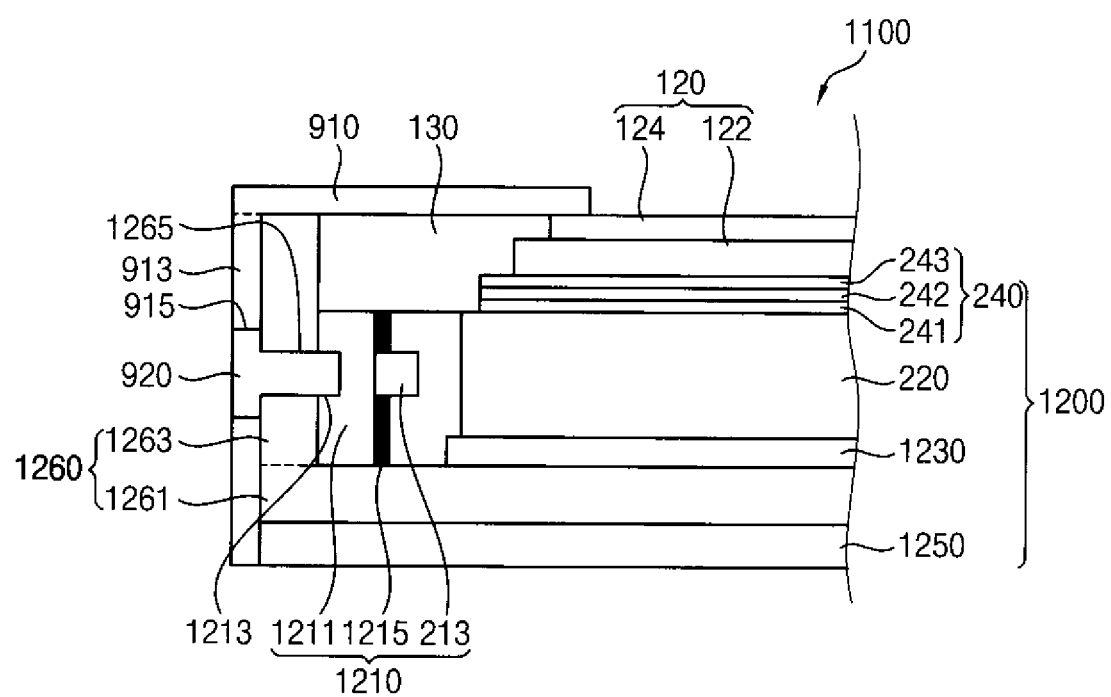
FIG. 13 is a cross-sectional view illustrating still another exemplary embodiment of a display apparatus according to still the invention.

FIG. 13 is a cross-sectional view illustrating still another exemplary embodiment of a display apparatus according to the invention.

The exemplary embodiment of display apparatus 1100 is substantially the same as the previous exemplary embodiment of the display apparatus 900 illustrated in FIG. 12 except for a light-emitting module 1210 of a backlight assembly 1200, a reflection sheet 1230 and an extrusion bar 1260. Thus, the same reference numerals will be used to refer to same or like parts as those described in the previous exemplary embodiment and any further repetitive explanation concerning the above elements will be omitted.

Referring to FIG. 13, the exemplary embodiment of the backlight assembly 1200 includes the light-emitting module 1210, the light guide plate 220, the reflection sheet 1230, the extrusion bar 1260, the optical sheets 240 and a lower receiving container 1250.

The light-emitting module 1210 includes a PCB 1211, the light source 213 and a first light absorption portion 1215. The light source 213 is mounted on a front surface of the PCB 1211, and a groove 1213 is in a rear surface of the PCB 1211 and extending toward an inner area of the PCB 1211. The first light absorption portion 1215 is on the front surface of the PCB 1211, and absorbs the light reflected by the light guide plate 220 among the light incident into the light guide plate 220 from the light-emitting module 1210.

The reflection sheet 1230 is disposed between the light guide plate 220 and the extrusion bar 1260, and reflects a light leaking from the light guide plate 220.

The extrusion bar 1260 includes a bottom portion 1261 disposed under the light-emitting module 1210, and a third side wall 1263 vertically extending from the bottom portion 1261 and making contact with the the rear surface of the PCB 1211. A third hole 1265 is in the third side wall 1263. The extrusion bar 1260 may include a metal material such as an aluminum material, and thus the extrusion bar 1260 may transfer heat generated from the light-emitting module 1210 to the lower receiving container 1250 also having a metal material, so as to dissipate the heat to an outside.

The combining member 920 passes through the groove 1213 in the PCB 1211, the third hole 1265 in the third side wall 1263 of the extrusion bar 1260 and the second hole 915 in the second side wall 913 of the upper receiving container 910 to combine the upper receiving container 910 with the backlight assembly 1200 each other.

According to the exemplary embodiment, the combining member 920 passes through the groove 1213 in the PCB 1211, the third hole 1265 in the third side wall 1263 of the extrusion bar 1260 and the second hole 915 in the second side wall 913 of the upper receiving container 910, and thus combining of the upper receiving container 910 with the backlight assembly 1200 may be strengthened.

In addition, the extrusion bar 1260 is disposed between the light-emitting module 1210 and the lower receiving container 1250, and thus the heat generated from the light-emitting module 1210 is efficiently dissipated. Thus, damage due to heat of the light guide plate 220 and the display panel 120 may be reduced or effectively prevented.

According to one or more exemplary embodiments of the light-emitting module, the backlight assembly including the light-emitting module and the display apparatus including the light-emitting module, a light absorption portion is on the PCB of the light emitting module on which a light source is mounted, and thus a light reflected by a light guide plate is absorbed and leaking of a light from a backlight assembly may be reduced or effectively prevented. Thus, a display quality of the display apparatus may increase.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A light-emitting module comprising:
a plurality of light sources which generates and emits a light;
a printed circuit board including a first surface, and the plurality of light sources disposed on the first surface;
a light absorption portion on the first surface of the printed circuit board, wherein the light absorption portion absorbs the light, and contacts each of the light sources; and
a light reflection portion disposed on the first surface of the printed circuit board and disposed between adjacent light sources of the plurality of light sources,
wherein a width of the light absorption portion taken along a longitudinal axis of the printed circuit board is substantially the same as a width of each of the plurality of light sources taken along the longitudinal axis of the printed circuit board, and
wherein a thickness of the light absorption portion measured in a direction perpendicular to the first surface of the printed circuit board is smaller than that of the plurality of light sources measured in the direction.

2. The light-emitting module of claim 1, wherein the light absorption portion includes a black material.

3. The light-emitting module of claim 2, wherein the black material includes a black photo solder resist.

4. The light-emitting module of claim 1, wherein the light absorption portion on the first surface of the printed circuit board is above the plurality of light sources and below the plurality of light sources.

5. The light-emitting module of claim 1, wherein the light reflection portion includes a white material.

6. A backlight assembly comprising:
a light-emitting module including:
a plurality of light sources which generates and emits a light,
a printed circuit board including a first surface, and the plurality of light sources disposed on a first surface,
a light absorption portion on the first surface of the printed circuit board, wherein the light absorption portion absorbs the light, and contacts each of the light sources, and
a light reflection portion disposed on the first surface of the printed circuit board and disposed between adjacent light sources of the plurality of light sources;
a light guide plate adjacent to the light-emitting module, and including a side surface into which the light is incident and a light exiting surface through which the light incident into the side surface exits; and
a lower receiving container which receives the light-emitting module and the light guide plate,
wherein a width of the light absorption portion taken along a longitudinal axis of the printed circuit board is substantially the same as a width of each of the plurality of light sources taken along the longitudinal axis of the printed circuit board, and
wherein a thickness of the light absorption portion measured in a direction perpendicular to the first surface of the printed circuit board is smaller than that of the plurality of light sources measured in the direction.

7. The backlight assembly of claim 6, further comprising:
a light enhancing optical sheet which faces the light exiting surface of the light guide plate; and
a second light absorption portion at an edge portion of a surface of the optical sheet, wherein the second light absorption portion absorbs the light.

8. The backlight assembly of claim 7, wherein the second light absorption portion includes a black material.

9. The backlight assembly of claim 7, wherein the second light absorption portion absorbs a light reflected by the light-emitting module and the light guide plate.

10. The backlight assembly of claim 7, wherein the second light absorption portion is on an upper surface of the optical sheet.

11. The backlight assembly of claim 7, wherein the second light absorption portion is on a lower surface of the optical sheet.

12. The backlight assembly of claim 7, wherein the second light absorption portion is at an edge portion of the optical sheet adjacent to the light-emitting module.

13. The backlight assembly of claim 7, wherein the second light absorption portion is at two edge portions of the optical sheet adjacent to the light-emitting module.

14. The backlight assembly of claim 7, wherein the second light absorption portion is at four edge portions of the optical sheet.

15. The backlight assembly of claim 6, wherein the light reflection portion includes a white material.

16. A display apparatus comprising:
- a backlight assembly including:
    - a light-emitting module including:
        - a plurality of light sources which generates and emits a light,
        - a printed circuit board including a first surface, and the plurality of light sources disposed on the first surface,
        - a light absorption portion on the first surface of the printed circuit board, wherein the light absorption portion absorbs the light, and contacts each of the light sources, and
        - a light reflection portion disposed on the first surface of the printed circuit board and disposed between adjacent light sources of the plurality of light sources,
    - wherein a width of the light absorption portion taken along a longitudinal axis of the printed circuit board is substantially as same as a width of each of the plurality of light sources taken along the longitudinal axis of the printed circuit board,
    - a light guide plate adjacent to the light-emitting module, and including a side surface into which the light is incident and a light exiting surface through which the light incident into the side surface exits, and
    - a lower receiving container which receives the light-emitting module and the light guide plate, and
- a display panel which displays an image using the light exiting from the light exiting surface of the light guide plate,
- wherein a thickness of the light absorption portion measured in a direction perpendicular to the first surface of the printed circuit board is smaller than that of the plurality of light sources measured in the direction.

17. The display apparatus of claim 16, further comprising:
- an upper receiving container which is combined with the lower receiving container and receives the display panel; and
- a combining member which combines the upper receiving container with the printed circuit board.

18. The display apparatus of claim 17, wherein the printed circuit board further includes a groove in a second surface thereof,
- wherein
- the second surface is opposite to the first surface including the plurality of light sources, and
- the combining member is in the groove.

* * * * *